US008218065B2

(12) United States Patent
Suzuki et al.

(10) Patent No.: US 8,218,065 B2
(45) Date of Patent: Jul. 10, 2012

(54) IMAGING DEVICE

(75) Inventors: Yuichi Suzuki, Osaka (JP); Masayuki Ozaki, Osaka (JP)

(73) Assignee: Panasonic Corporation, Osaka (JP)

( * ) Notice: Subject to any disclaimer, the term of this patent is extended or adjusted under 35 U.S.C. 154(b) by 613 days.

(21) Appl. No.: 12/438,240

(22) PCT Filed: Aug. 21, 2007

(86) PCT No.: PCT/JP2007/066201
§ 371 (c)(1),
(2), (4) Date: Feb. 20, 2009

(87) PCT Pub. No.: WO2008/023706
PCT Pub. Date: Feb. 28, 2008

(65) Prior Publication Data
US 2010/0177236 A1  Jul. 15, 2010

(30) Foreign Application Priority Data
Aug. 22, 2006 (JP) ................. 2006-224865

(51) Int. Cl.
G03B 13/00 (2006.01)
(52) U.S. Cl. .......................... 348/349; 396/96
(58) Field of Classification Search .......... 348/349; 396/96
See application file for complete search history.

(56) References Cited

U.S. PATENT DOCUMENTS

| 6,661,451 B1* | 12/2003 | Kijima et al. | 348/220.1 |
| 2003/0030740 A1* | 2/2003 | Tsujino | 348/333.01 |
| 2003/0107664 A1 | 6/2003 | Suzuki | |
| 2003/0122952 A1* | 7/2003 | Kuroiwa | 348/333.11 |
| 2003/0193600 A1* | 10/2003 | Kitamura et al. | 348/333.01 |
| 2005/0062872 A1* | 3/2005 | Nakashima et al. | 348/349 |
| 2005/0219403 A1* | 10/2005 | Hyodo | 348/349 |
| 2006/0170812 A1* | 8/2006 | Kobayashi | 348/345 |
| 2008/0240700 A1* | 10/2008 | Takagi | 396/98 |

FOREIGN PATENT DOCUMENTS

| JP | 2002-165141 | 6/2002 |
| JP | 2002-300457 | 10/2002 |
| JP | 2003-333409 | 11/2003 |
| JP | 2003-348437 | 12/2003 |
| JP | 2005-092081 | 4/2005 |

* cited by examiner

Primary Examiner — W. B. Perkey
Assistant Examiner — Fang-Chi Chang
(74) Attorney, Agent, or Firm — Hamre, Schumann, Mueller & Larson, P.C.

(57) ABSTRACT

An imaging device of the present invention includes a normal operation period and a focusing operation period and includes: a CCD (102) able to perform thinning processing on image signals of an imaging subject; an AFE (103) that converts the image signals into image data; a signal processing unit (104*b*) that converts the image data into display data; an LCD (107) that displays an image based on the display data; and a thinning control unit (104*c*) that that changes a read frame rate and thinning rate of the CCD (102). The thinning control unit (104*c*) performs control so that in the focusing operation period, image signals are read from the CCD (102) at a higher read frame rate than in the normal operation period, and so that in the focusing operation period and a frame immediately before the focusing operation period, image signals are read from the CCD (102) using a larger thinning rate than in the normal operation period. This structure enables providing an imaging device that can perform through-the-lens display in all areas of all frames in the focusing operation period.

31 Claims, 9 Drawing Sheets

IMAGING DEVICE

TECHNICAL FIELD

The present invention relates to a focusing operation of an imaging device. More specifically, the present invention relates to technology that enables a high-speed focusing operation even if an imaging subject is dark.

BACKGROUND ART

In recent years, the prevalence of digital cameras has been significant. With a compact digital camera for beginners to photography, it is desirable to be able to take photos of roughly a certain quality regardless of the user's skill. Therefore, focusing is normally performed automatically, and there is a need to shorten the focusing operation period as much as possible so that a photo opportunity is not missed.

Many compact digital cameras do not have an optical viewfinder, and in the focusing operation period as well, an imaging subject continues to be viewed on a liquid crystal display unit arranged on the back face of the digital camera body. Therefore, in the focusing operation period as well, it is necessary to display an image of the imaging subject on the display unit without causing a sense of unpleasantness.

There are mainly two automatic focusing operation methods, namely an active method and a passive method. An active method is a method in which the distance to an imaging subject is measured by irradiating an imaging subject with infrared radiation or ultrasonic waves and receiving infrared radiation or ultrasonic waves that have reflected off of the imaging subject. Active methods often are employed in compact silver salt cameras.

On the other hand, a passive method is a method in which the distance to an imaging subject is measured based on images captured by an optical system. Passive methods further can be divided into phase difference detection methods and contrast detection methods. A phase difference detection method often is employed in single lens reflexive cameras, regardless of whether the camera is a silver salt camera or digital camera. On the other hand, a contrast detection method is often employed in compact digital cameras.

In a contrast detection method, images are obtained from an imaging element while gradually moving a focus lens in an optical system in the optical axis direction, and the focal position is set to the position of the focus lens where the contrast of the obtained image is maximal. Contrast generally is evaluated based on a high frequency component in an image obtained from an imaging element.

Since the evaluation of the high frequency component is performed on a frame-by-frame basis, shortening the focusing operation period requires raising the read frame rate of the imaging element. However, when the read frame rate of the imaging element is raised, the time available for processing output image signals of the imaging element becomes shorter. Therefore, the image displayed on the display unit is frozen in the focusing operation period.

A digital camera that solves the above problem has been proposed (see Patent Document 1). FIG. 9 is a conceptual diagram of a display unit in the focusing operation period of the digital camera according to Patent Document 1. Since the imaging subject that the user is focusing on often exists in the center of the screen, only the center portion of the imaging element is used in the focusing period.

A cutout area 501 necessary for the focusing operation is an area in which an image (through-the-lens image) is displayed based on an image signal obtained by reading the image signals of all the pixels. On the other hand, non-cutout areas 502a and 502b that are not used in the focusing operation are areas in which signals output from the imaging element are not processed and an image is freeze-displayed in these areas based on images signals that have been output from the imaging element immediately before the focusing operation period. Accordingly, even if the read frame rate of the imaging element is raised, only image signals output from the imaging element pertaining to the cutout area 501 are processed, thereby enabling performing through-the-lens display in the cutout area 501.

Patent Document 1: JP 2002-300457A

DISCLOSURE OF INVENTION

Problem to be Solved by the Invention

However, in the digital camera disclosed in Patent Document 1, the non-cutout areas 502a and 502b in the top and bottom portions of the screen continue to be freeze-displays. Also, in a frame immediately before the focusing operation period, all of the image signals are read from the imaging element, and these imaging signals must be processed in the first frame of the focusing operation period that the read frame rate has been raised. Therefore, there is the problem in which the processing cannot be completed in time, and the first frame of the focusing operation period is freeze-displayed over the entire screen.

An object of the present invention is to provide an imaging device that can perform through-the-lens display in all areas of all frames in the focusing operation period.

Means for Solving Problem

A first structure of an imaging device of the present invention is an imaging device including a normal operation period and a focusing operation period and including: an imaging element able to perform thinning processing on image signals of an imaging subject; a first signal processing unit that converts the image signals into image data; a second signal processing unit that converts the image data into display data; a display unit that displays an image based on the display data; a read frame rate control unit that changes a read frame rate of the imaging element; and a thinning control unit that changes a thinning rate of the imaging element. The read frame rate control unit performs control so that in the focusing operation period, the image signals are read from the imaging element at a higher read frame rate than in the normal operation period, and the thinning control unit performs control so that in the focusing operation period and a frame that is immediately before the focusing operation period, the image signals are read from the imaging element using a larger thinning rate than in the normal operation period.

A second structure of an imaging device of the present invention is an imaging device including a normal operation period and a focusing operation period and including: an imaging element that generates image signals of an imaging subject; a first signal processing unit that converts the image signals into image data; a second signal processing unit able to perform thinning processing on the image data and that converts image data resulting from the thinning processing into display data; a display unit that displays an image based on the display data; a read frame rate control unit that changes a read frame rate of the imaging element; and a thinning control unit that changes a thinning rate of the second signal processing unit. The read frame rate control unit performs control so that in the focusing operation period, the image signals are read from the imaging element at a higher read frame rate than in the normal operation period, and the thinning control unit performs control so that in the focusing operation period and a frame that is immediately before the focusing operation period, the second signal processing unit converts the image data into the display data using a larger thinning rate than in the normal operation period.

A third structure of an imaging device of the present invention is an imaging device including a normal operation period and a focusing operation period and including: an imaging element able to perform thinning processing on image signals of an imaging subject; a first signal processing unit that converts the image signals into image data; a second signal processing unit able to perform thinning processing on the image data and that converts image data resulting from the thinning processing into display data; a display unit that displays an image based on the display data; a read frame rate control unit that changes a read frame rate of the imaging element; a first thinning control unit that changes a thinning rate of the imaging element; and a second thinning control unit that changes a thinning rate of the second processing unit. The read frame rate control unit performs control so that in the focusing operation period, the image signals are read from the imaging element at a higher read frame rate than in the normal operation period, the first thinning control unit performs control so that in the focusing operation period, the image signals are read from the imaging element using a higher thinning rate than in the normal operation period, and the second thinning control unit performs control so that in a frame that is immediately before the focusing operation period, the second signal processing unit converts the image data into the display data using a larger thinning rate than in the normal operation period.

A fourth structure of an imaging device of the present invention is an imaging device including a normal operation period and a focusing operation period and including: an imaging element able to perform thinning processing on image signals of an imaging subject; a first signal processing unit that converts the image signals into image data; a second signal processing unit able to perform thinning processing on the image data and that converts image data resulting from the thinning processing into display data; a display unit that displays an image based on the display data; a read frame rate control unit that changes a read frame rate of the imaging element; a first thinning control unit that changes a thinning rate of the imaging element; and a second thinning control unit that changes a thinning rate of the second processing unit. The read frame rate control unit performs control so that in the focusing operation period, the image signals are read from the imaging element at a higher read frame rate than in the normal operation period, the second thinning control unit performs control so that in the focusing operation period, the second signal processing unit converts the image data into the display data using a larger thinning rate than in the normal operation period, and the first thinning control unit performs control so that in a frame that is immediately before the focusing operation period, the image signals are read from the imaging element using a higher thinning rate than in the normal operation period.

Effects of the Invention

According to the present invention, image signals of the imaging element are read using a higher thinning rate in the frame immediately before the focusing operation period than the thinning rate in the normal operation period, and therefore output image signals of the imaging element in the frame immediately before the focusing operation can be processed in the first frame of the focusing operation period, even if the read frame rate in the focusing operation period has risen.

Also, adjusting the thinning rate in the focusing operation period enables through-the-lens display to be performed in all areas of the display unit in the focusing operation period as well. This has the superior effect of enabling through-the-lens display in all areas of all frames in the focusing operation period.

Figure 1:
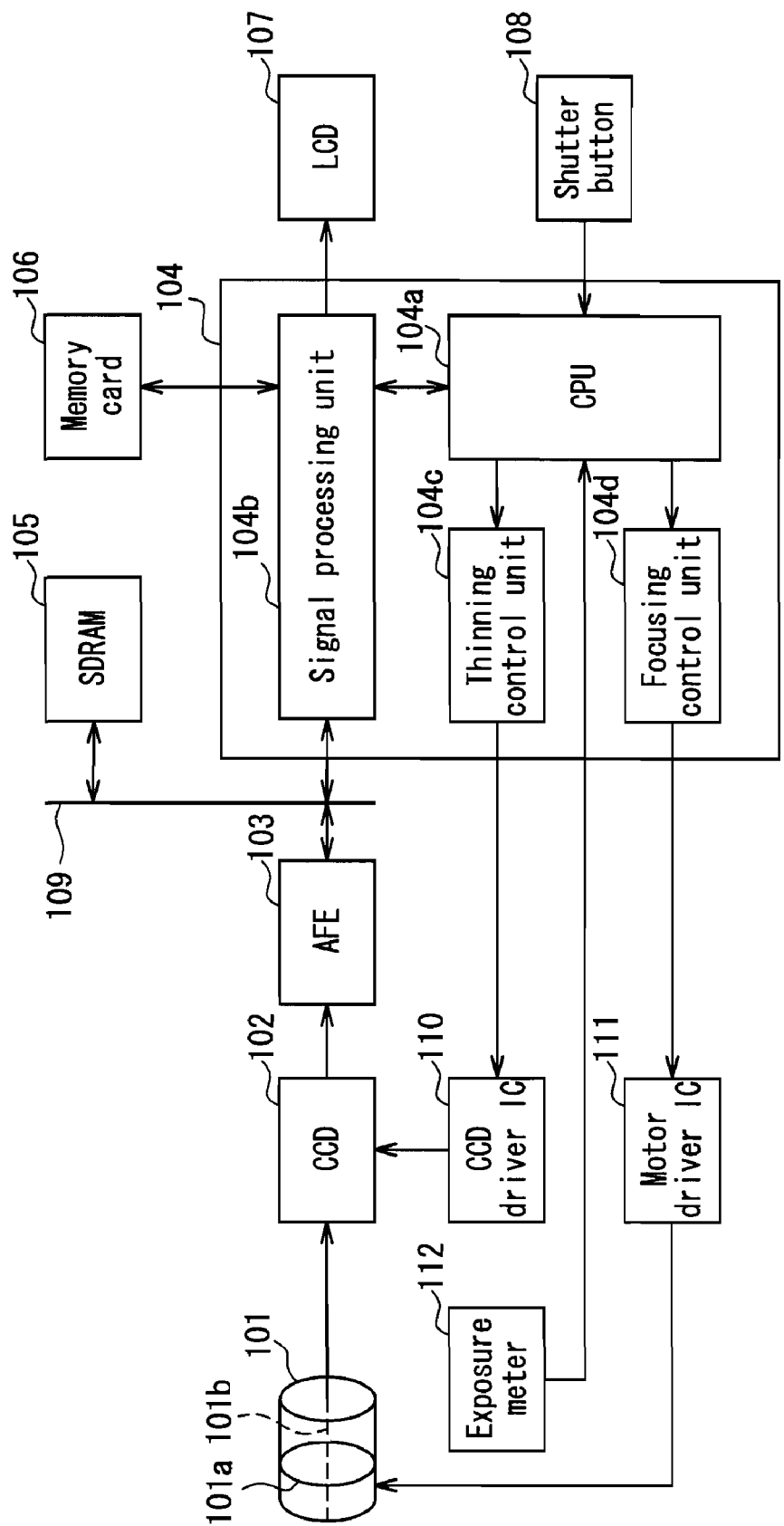
FIG. 1 is a block diagram showing a structure of a digital camera in Embodiment 1.

DESCRIPTION OF THE CHARACTERS 101 optical system
101a focus lens
101b optical axis
102 CCD
103 AFE
104 signal processing LSI
104a CPU
104b signal processing unit
104c thinning control unit
104d focusing control unit
104e thinning control unit
104f pixel mixing control unit
105 SDRAM
106 memory card
107 LCD
108 shutter button
109 bus
110 CCD driver IC
111 motor driver IC
112 exposure meter

DESCRIPTION OF THE INVENTION

An imaging device of the present invention can have various forms such as the following, based on the above-described structure.

In other words, in the imaging device of the present invention, a thinning rate in a frame immediately before the focusing operation period may be smaller than a thinning rate in the focusing operation period. According to this structure, output image signals of the imaging element can be processed even if the read frame in the focusing operation period has risen, thereby enabling preventing the freezing of part or all of an image being displayed on the display unit.

Also, the thinning control unit may change a thinning rate of a predetermined number of frames that follow the focusing operation period. According to this structure, through-the-lens display can be performed in all areas of the display unit in the focusing operation period as well, and through-the-lens display can be performed in all areas of all frames in the focusing operation period.

Also, the read frame rate control unit may perform control so that in a frame that is immediately before the focusing operation period, the image signals are read from the imaging element at a read frame rate that is higher than a read frame rate of the normal operation period and lower than a read frame rate of the focusing operation period. According to this structure, in a case of transitioning from the normal operation period to the focusing operation period, there is no extreme change in the read frame rate, and images of the imaging subject continuously can be displayed more smoothly.

Also, the display unit may display the image based on the display data at a display frame rate that is the same as a read frame rate of the imaging element. According to this structure, images of the imaging subject continuously can be displayed more smoothly in the focusing operation period.

Also, in the focusing operation period, the display unit may display the image based on the display data at a display frame rate that is the same as a read frame rate of the imaging element in the normal operation period. This structure eliminates a change in the display frame rate even in the focusing operation period, thereby enabling avoiding a sense of unpleasantness due to a change in the display frame rate.

Also, the image device further may include: a luminance detection unit that detects a brightness of an imaging subject, wherein the read frame rate control unit may change a read frame rate of the focusing operation period according to the brightness of the imaging subject detected by the luminance detection unit. According to this structure, the read frame rate is lowered to ensure a longer exposure time if the imaging subject is dark, and the read frame rate is raised if the imaging subject is bright, thereby enabling further shortening the focusing operation period.

Also, the read frame rate control unit may change a read frame rate of a frame that is immediately before the focusing operation period according to the brightness of the imaging subject detected by the luminance detection unit. According to this structure, the read frame rate of the frame immediately before the focusing operation period is lowered if the imaging subject is dark. This enables taking a longer exposure time. On the other hand, if the imaging subject is bright, the exposure time can be shorter, and therefore the read frame rate of the frame immediately before the focusing operation period is raised. This enables further shortening of the focusing operation period.

Also, if the brightness of the imaging subject detected by the luminance detection unit is darker than a predetermined brightness, the read frame rate control unit may perform control so that the image signals are read from the imaging element after a plurality of frame periods in the focusing operation period have elapsed. This structure enables obtaining the same effect as lowering the read frame rate.

Also, the imaging device may further include: a pixel mixing control unit that changes a pixel mixing number of the imaging element, wherein the pixel mixing control unit may perform control so that in the focusing operation period, the image signals are read from the imaging element using a larger pixel mixing number than in the normal operation period. This structure enables obtaining the same effect as lengthening the exposure time if the amount of light from the imaging subject is insufficient, thereby enabling the focusing operation to be performed stably.

Also, the read frame rate control unit may perform control so that if the pixel mixing number in the normal operation period is greater than or equal to a predetermined value, in the focusing operation period, the image signals are read from the imaging element based on a read frame rate in the normal operation period. If the amount of light from the imaging subject is already small in the normal operation period, this structure enables preventing the amount of light from becoming even smaller in the focusing operation period. Accordingly, this helps keep the focusing operation stable.

[Embodiment 1]
[1. Imaging Device Structure]

FIG. 1 is a block diagram of a digital camera in the embodiment.

An optical system 101 forms an image of an imaging subject on a CCD 102 (CCD: Charge Coupled Device). The optical system 101 is comprising a plurality of lens groups (not shown) and includes a focus lens 101a. The image of the imaging subject is focused on the CCD 102 by the movement of the focus lens 101a inside a barrel, which is holding the lens groups, in the direction of an optical axis 101b.

The CCD 102 converts the formed optical image of the imaging subject into an electrical signal (image signal), and outputs the electrical signal. An AFE (Analog Front End) 103 converts the image signal output from the CCD 102, which is an analog signal, into image data that is a digital signal, and stores the image data in an SDRAM 105 (Synchronous Dynamic Random Access Memory) via a bus 109. The AFE 103 is an LSI that includes a CDS (Correlated Double Sampling) circuit that eliminates a noise component of an image signal, an AGC (Automatic Gain Control) amplifier that adjusts the level of an image signal, and an A/D converter that converts an analog signal into a digital signal (none of which are shown).

A signal processing LSI 104 comprises a CPU (Central Processing Unit) 104a, a signal processing unit 104b, a thinning control unit 104c, and a focusing control unit 104d. The CPU 104a controls an entirety of the signal processing LSI 104 in accordance with an instruction recorded on a ROM (Read Only Memory, not shown) in the signal processing LSI 104. The signal processing unit 104b converts image data stored in the SDRAM 105 by the AFE 103 into image data for display (hereinafter, called display data) that is suited for display on an LCD (Liquid Crystal Display) 107, and outputs the display data to the LCD 107.

The signal processing LSI 104 causes a focusing operation period to start, in accordance with a shutter button 108 being pressed halfway in a condition in which display data is being output to the LCD 107. Also, the signal processing LSI 104 controls units so as to perform imaging, in accordance with the shutter button 108 being fully pressed. If image data stored in the SDRAM 105 is image data captured in accordance with the shutter button 108 being fully pressed, the signal processing unit 104b performs control so as to cause the image data stored in the SDRAM 105 to be converted into record data and recorded to a memory card 106. Also, the signal processing unit 104b converts record data recorded to the memory card 106 into display data and causes an image to be displayed on the LCD 107 based on the display data.

When the focusing operation period starts in accordance with the shutter button 108 being pressed halfway, the signal processing unit 104b obtains an intensity of a high frequency component of image data stored in the SDRAM 105. The high frequency component of the image data is obtained by transforming the image data into spatial frequency data by Fourier transformation, discrete cosine transformation, wavelet transformation, or the like.

The focusing control unit 104d sends a drive signal to the motor driver IC 111 based on information pertaining to the high frequency component that was sent from the signal processing unit 104b, to cause the focus lens 101a to move a small distance to a telephoto side or a wide-angle side. After the focus lens 101a has moved a small distance, the signal processing unit 104b again obtains the intensity of a high frequency component of image data stored in the SDRAM 105. The focusing control unit 104d repeats the above operation and causes the focus lens 101a to move to a focal position where the intensity of the high frequency component is maximal.

The thinning control unit 104c performs control so that image signals of the CCD 102 are thinned and then read. Also, the thinning control unit 104c has a function of changing the thinning rate. When the image signals of the CCD 102 are thinned and then read, the number of image signals to be read is reduced, thereby enabling high-speed reading. The thinning control unit 104c also has a function of changing the read frame rate of the CCD 102.

The thinning control unit 104c sends a drive signal to the CCD driver IC 110 to instruct a change in the thinning rate.

The exposure meter 112 detects the brightness of the imaging subject and notifies the CPU 104a of the detected brightness.

Note that the CCD 102 is an example of an imaging element of the present invention. The AFE 103 is an example of a first signal processing unit of the present invention. The signal processing unit 104b is an example of a second signal processing unit of the present invention. The LCD 107 is an example of a display unit of the present invention. The thinning control unit 104c includes the functionality of a read frame rate control unit and a thinning control unit of the present invention. The exposure meter 112 is an example of a luminance detection unit of the present invention.

Also, the AFE 103 corresponding to the first signal processing unit of the present invention and the signal processing LSI 104 including the signal processing unit 104b that corresponds to the second signal processing unit of the present invention may be constituted from a signal LSI. The thinning control unit 104c may be included in the signal processing unit 104b. The CPU 104a may be structured so as to be able to execute the functionality of the thinning control unit 104c.

[2. Imaging Device Operations]

Figure 2:
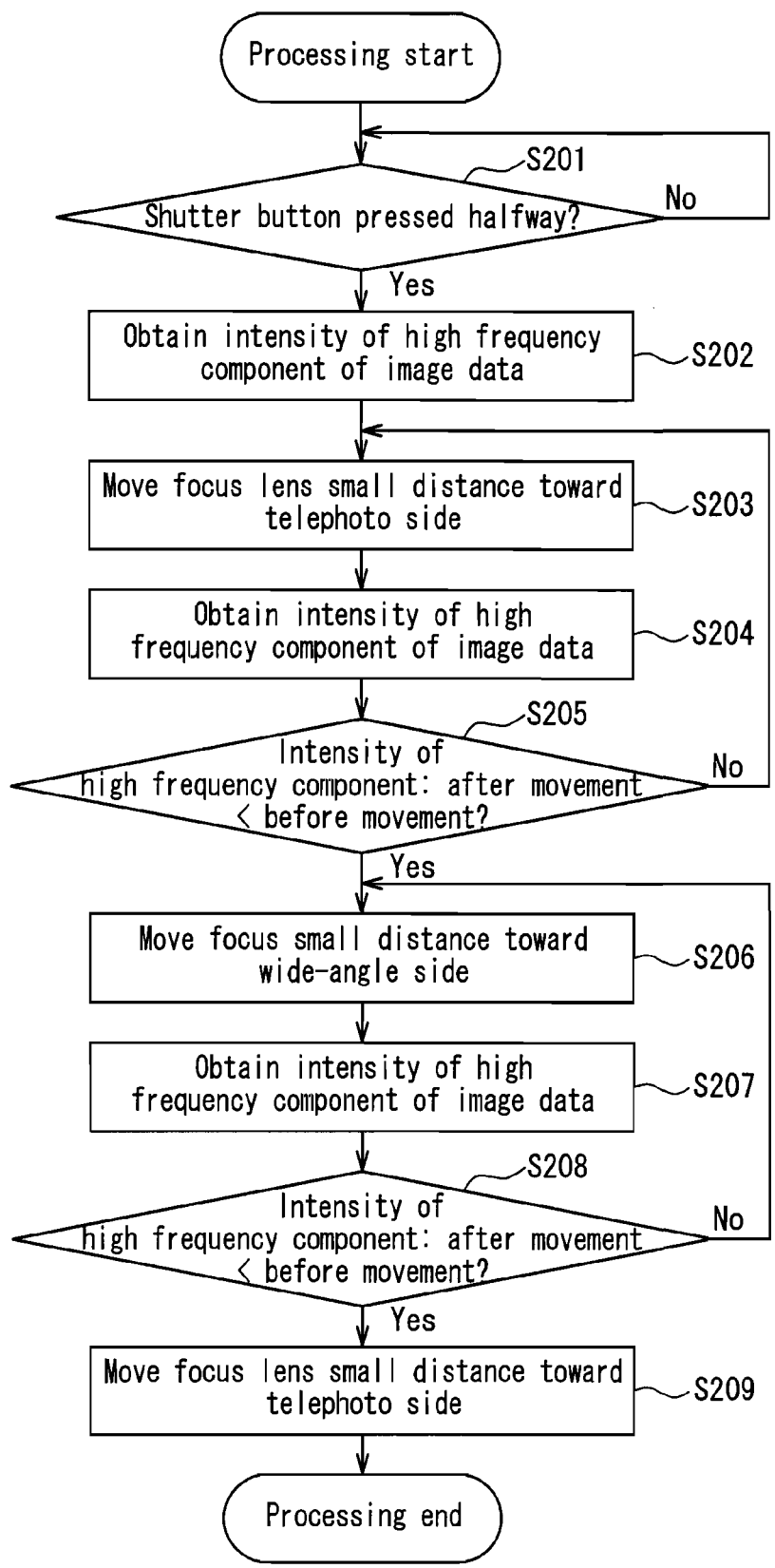
FIG. 2 is a flowchart showing an example of focusing operation processing.

FIG. 2 is a flowchart showing an example of focusing operation processing. In accordance with the shutter button 108 being pressed halfway, the focusing operation is started (S201: YES judgment). The CCD 102 periodically outputs image signals in the focusing operation period as well. The AFE 103 updates and stores the SDRAM 105 with the image signals output from the CCD 102.

Next, the signal processing unit 104b obtains the intensity of the high frequency component of the image data currently output from the AFE 103 (S202).

Next, the focusing control unit 104d controls the motor driver IC 111 based on the intensity of the high frequency component obtained by the signal processing unit 104b, to cause the focus lens 101a to move a small distance toward the telephoto side (S203).

Next, the signal processing unit 104b again obtains the intensity of the high frequency component of image data output from the AFE 103 (S204).

Next, the signal processing unit 104b repeats the processing of steps S203 and S204 if the intensity of the high frequency component obtained after moving the focus lens 101a is higher than the intensity of the high frequency component obtained before moving the focus lens 101a (S205: NO judgment).

On the other hand, the signal processing unit 104b outputs a lens move instruction to the focusing control unit 104d if the intensity of the high frequency component obtained after moving the focus lens 101a is lower than the intensity of the high frequency component obtained before moving the focus lens 101a (S205: YES judgment). Based on the instruction from the signal processing unit 104b, the focusing control unit 104d controls the motor driver IC 111 to cause the focus lens 101a to move a small distance toward the wide-angle side (S206).

Next, the signal processing unit 104b again obtains the intensity of the high frequency component of image data output from the AFE 103 (S207).

Next, the signal processing unit 104b repeats the processing of steps S206 and S207 if the intensity of the high frequency component obtained after moving the focus lens 101a is higher than the intensity obtained before the movement (S208: NO judgment).

If the intensity of the high frequency component obtained after moving the focus lens 101a is lower than the intensity of the high frequency component obtained before moving the focus lens 101a (S208: YES judgment), the signal processing unit 104b causes the focus lens 101a to move a small distance toward the telephoto side one time (S209), and ends processing.

Performing the control such as described above obtains a focal position of the focus lens 101a where the intensity of the high frequency component of the image data is maximal.

[3. Transition in Imaging Device Operations]

[3-1. Transition from Normal Operation to Focusing Operation]

Figure 3:
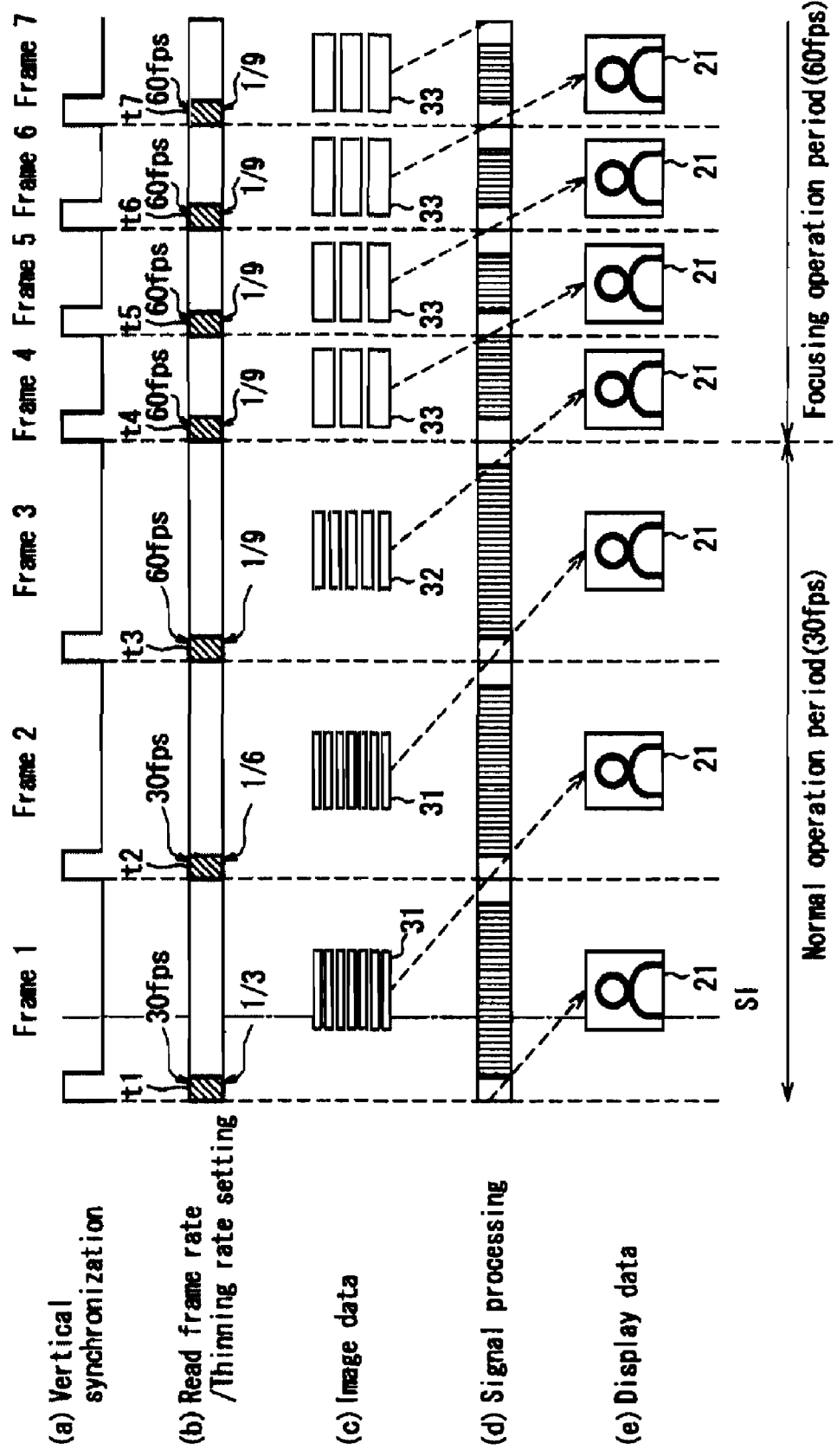
FIG. 3 is a timing chart showing a transition from a normal operation period to a focusing operation period in Embodiment 1.

FIG. 3 is a timing chart showing a transition from a normal operation period to the focusing operation period. FIG. 3(a) shows a vertical synchronization signal. In FIG. 3(b), t1 to t7 indicate periods in which read frame rate setting and thinning rate setting are performed. Also, FIG. 3(b) shows a read frame rate and thinning rate to be set in each frame, and the set read frame rate and thinning rate become enabled in the next frame. FIG. 3(c) diagrammatically shows images based on image data output from the CCD 102 and stored in the SDRAM 105. Note that in the images shown in FIG. 3(c), the degree of thinning is indicated by the thinness of the stripes, where the higher the thinning rate the thicker the stripes. In FIG. 3(c) an image 31 is an image that has been thinned at a rate of 1/3, an image 32 is an image that has been thinned at a rate of 1/6, and an image 33 is an image that has been thinned at a rate of 1/9. FIG. 3(d) shows timings of signal processing in which the signal processing unit 104b converts image data into display data. FIG. 3(e) diagrammatically shows images based on display data. In FIG. 3(e), an image 21 is an image in an out-of-focus condition.

In the transition shown in FIG. 3, a timing S1 in the middle of frame 1 is a timing when the shutter button 108 is pressed halfway. The normal operation period is from frame 1 to frame 3, and the focusing operation period is from frame 4 to frame 7. In the normal operation period, the read frame rate of the CCD 102 is 30 fps (frame per second), and in the focusing operation period, the read frame rate is raised to 60 fps in order to perform high-speed focusing. The focusing operation period continues from frame 7 onward as well (not shown), until the focusing operation has been completed.

Read frame rate setting is performed in the periods t1 to t7 (vertical synchronization periods) shown in FIG. 3(b), and the content of the setting becomes enabled in the next frame. In frame 1 and frame 2, the read frame rate is set to 30 fps. In frame 3, the read frame rate is set to 60 fps in order for the read frame rate to be 60 fps from frame 4 onward. From frame 4 onward, the read frame rate continues to be set to 60 fps.

Thinning rate setting is performed in the periods t1 to t7 (vertical synchronization periods) shown in FIG. 3(b), and the content of the setting becomes enabled in the next frame. A thinning rate of 1/3 is set in frame 1. A thinning rate of 1/6 is set in frame 2. Also, a thinning rate of 1/9 is set from frame 3 onward.

In frame 1, image signals are read from the CCD 102 based on the thinning rate (1/3) set in the previous frame. Also, in frame 2, image signals are read from the CCD 102 based on the thinning rate (1/3) set in frame 1. In frame 3, which is the frame immediately before the focusing operation period, image signals are read from the CCD 102 based on the thinning rate (1/6) set in frame 2. From frame 4 to frame 7, which are in the focusing operation period, image signals are read from the CCD 102 based on the thinning rate (1/9) set from frame 3 to frame 6.

In the focusing operation period, the read frame rate becomes 60 fps, and therefore a sufficient amount of time is not available to process image data read at the thinning rate of 1/3. In view of this, image signals are thinned at a higher thinning rate in the focusing operation period than in the normal operation period, and then read. Also, in frame 3 as well, which is the frame immediately before the focusing operation period, image signals are read from the CCD 102 based on a thinning rate (1/6) that is higher than the thinning rate of image signals in frame 2 and other previous frames.

Also, in general, the number of pixels in the CCD 102 is from several million pixels to roughly 10 million pixels, and in contrast, the number of pixels in the LCD 107 remains at several hundred thousand pixels. Therefore, in a case of displaying an image of the imaging subject on the LCD 107, YC separation processing and reduction processing are performed to generate display data, regardless of the normal operation period or focusing operation period.

As shown in FIG. 3(e), the display data generation processing is performed in the frame after the image data has been stored in the SDRAM 105. In other words, the image data stored in the SDRAM 105 in frame 1 is converted into display data in frame 2. The image data stored in the SDRAM 105 in frame 2 is converted into display data in frame 3.

In frame 4, image data read in frame 3 based on the thinning rate (1/6) set in frame 2 is converted into display data. Also, although the read frame rate is set to 60 fps in frame 4 since frame 4 is in the focusing operation period, the thinning rate of the image data stored in the SDRAM 105 in frame 3 is set to 1/6, and therefore processing is possible since the amount of data targeted for processing has been reduced.

[3-2. Transition from Focusing Operation to Normal Operation]

Figure 4:
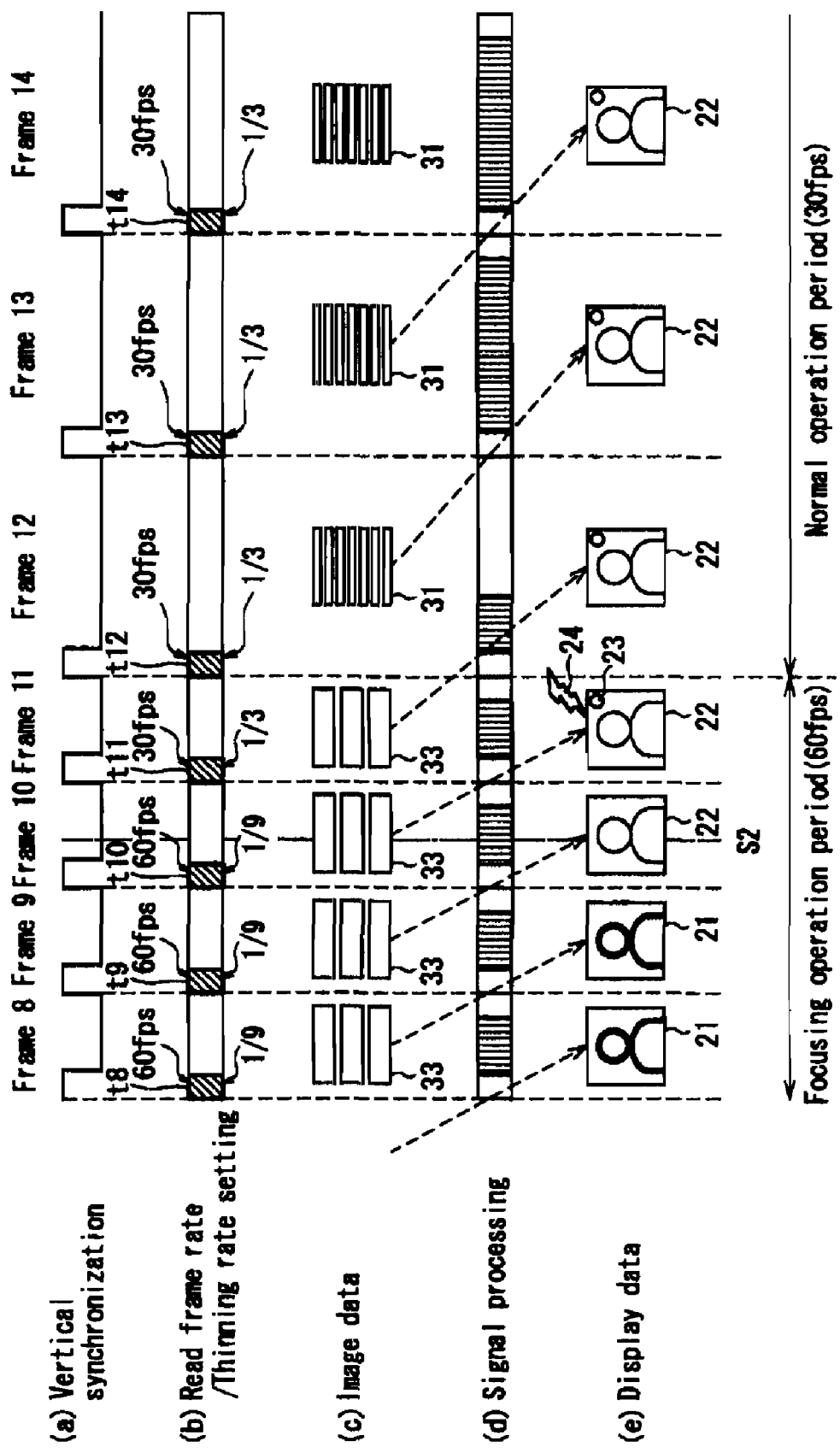
FIG. 4 is a timing chart showing a transition from the focusing operation period to the normal operation period.

FIG. 4 is a timing chart showing a transition from the focusing operation period to the normal operation period. The content of FIGS. 4(a) to (e) corresponds to the content of FIGS. 3(a) to (e) respectively. In FIG. 4, an image 22 indicates an image in an in-focus condition.

In FIG. 4, the focus is confirmed at a timing S2 in frame 10. When image focusing has been performed, a mark 23 is displayed on the image 22 as shown in FIG. 4(e) and a system sound 24 is output, thereby informing the user that the image has been focused. The mark 23 shown in FIG. 4(e) is displayed until the user releases the shutter button 108 from the halfway-pressed condition or until the user fully presses the shutter button 108 and imaging is performed.

The focusing operation period is from frame 8 to frame 11, and the normal operation period is from frame 12 to frame 14. The read frame rate of the CCD 102 is set to 60 fps in the focusing operation period, and lowered to 30 fps in the normal operation period.

Read frame rate setting is performed in the periods t8 to t14 (vertical synchronization periods) shown in FIG. 4(b), and the content of the setting becomes enabled in the next frame. From frame 8 to frame 10, the read frame rate is set to 60 fps. Since the focus is confirmed in frame 10, in frame 11 the read frame rate is set to 30 fps in order for the read frame rate to be 30 fps from frame 12 onward. From frame 12 onward, the read frame rate continues to be set to 30 fps.

Thinning rate setting is performed in the periods t8 to t14 (vertical synchronization periods) shown in FIG. 4(b), and the content of the setting becomes enabled in the next frame. Although the thinning rate is set to 1/9 from frame 8 to frame 10, focusing is confirmed in frame 10, and therefore the thinning rate is set to 1/3 in frame 11 so that image signals are read from the CCD 102 at the thinning rate of 1/3 from frame 12 onward. From frame 12 onward, the thinning rate is set to 1/3.

Also, from frame 8 to frame 11, image signals are read from the CCD 102 based on the thinning rate of 1/9 set from frame 7 to frame 10. From frame 12 to frame 14, which are in the normal operation period, image signals are read from the CCD 102 based on the thinning rate of 1/3 set from frame 11 to frame 13.

In the focusing operation period, the read frame rate becomes 60 fps, and therefore a sufficient amount of time is not available to process image data read at the thinning rate of 1/3. In view of this, image signals are thinned at a higher thinning rate in the focusing operation period than in the normal operation period, and then read.

As shown in FIG. 4(e), the display data generation processing is performed in the frame after the image data has been stored in the SDRAM 105. In frame 12, the image data read at the thinning rate of 1/9 in frame 11 is converted into display data. The read frame rate in frame 12 is 30 fps since frame 12 is in the normal operation period, and the image data stored in frame 11 is read at the thinning rate of 1/9. Therefore, the amount of data target for processing in frame 12 has been reduced, and processing is certainly possible.

[4. Effects of the Embodiment]

According to the present embodiment, image signals of the CCD 102 are read at a higher thinning rate in the frame immediately before the focusing operation period than the thinning rate in the normal operation period, and therefore image data can be processed even in the first frame of the focusing operation period in which the read frame rate has risen to 60 fps. This eliminates a whole-screen freeze-display in the first frame of the focusing operation period. Also, this eliminates freeze-display in part of the screen since image signals are thinned and then read in the focusing operation period as well.

This enables through-the-lens display in all areas of all frames in the focusing operation period, thereby obtaining the superior effect of being able to display images of the imaging subject on the display unit without a sense of unpleasantness in the focusing operation period as well.

[5. Other Structures]

[5.1 Thinning Control]

In the present embodiment, the thinning control unit 104c instructs the CCD driver IC 110 to change the thinning rate. Accordingly, in the focusing operation period and the frame immediately before the focusing operation period, image signals output from the CCD 102 are stored in the SDRAM 105 in a condition of having been thinned to a greater extent than in the normal operation period. However, the present invention is not limited to this.

For example, the thinning control unit 104c may instruct the signal processing unit 104b to change the thinning rate. Image signals output from the CCD 102 would be stored in the SDRAM 105 at the same thinning rate as in the normal operation period. When generating display data, in the focusing operation period and the frame immediately before the focusing operation period, the signal processing unit 104b would read image data stored in the SDRAM 105 while performing thinning to a greater extent than in the normal operation period. This enables the processing time required to perform YC separation processing and reduction processing to be shortened.

Note that the method of thinning image signals output from the CCD 102 as in the present embodiment (hereinafter, called method 1), and the method of thinning image data when the signal processing unit 104b generates display data as described above (hereinafter, called method 2) may be combined. Note that details of such a structure are described in Embodiment 2. For example, in the frame immediately before the focusing operation period, the second thinning control unit of the present invention would perform thinning according to method 2, and in the focusing operation period, the first thinning control unit of the present invention would perform thinning according to method 1. The opposite is also possible. This enables selecting the optimal thinning method. Also, this enables moving to the focusing operation at a faster timing after the shutter button 108 has been pressed halfway.

In the present embodiment, in the same way that the thinning control unit 104c encompasses the functionality of the read frame rate control unit and thinning control unit of the present invention, in a case of combining method 1 and method 2, the read frame rate control unit, first thinning control unit and second thinning control unit of the present invention may be integrated or separate.

In the present embodiment, the thinning rate of the frame immediately before the focusing operation period is set to an intermediate value that is between the thinning rate in the normal operation period and the thinning rate in the focusing operation period. Accordingly, in a case of transitioning from the normal operation period to the focusing operation period, there is no extreme change in the thinning rate and images of the imaging subject can be continuously displayed more smoothly.

Although the thinning rate is transitioned directly from 1/9 to 1/3 in the transition from the focusing operation period to the normal operation period in the present embodiment, the present invention is not limited to this. For example, control may be performed so that the thinning rate in the frame immediately after the focusing operation period is 1/6. Also, control may be performed to change gradually the thinning rate from 1/9 to 1/3 in a predetermined number of frames after the focusing operation period. Accordingly, in a case of transitioning from the focusing operation period to the normal operation period, there is no extreme change in the thinning rate and images of the imaging subject can be continuously displayed more smoothly.

[5-2. Read Frame Rate]

Although the read frame rate of the frame immediately before the focusing operation period is the same as the read frame rate in the normal operation period in the present embodiment, the read frame rate of the frame immediately before the focusing operation period may be set higher than the read frame rate in the normal operation period or lower than the read frame rate in the focusing operation period. Accordingly, in a case of transitioning from the normal operation period to the focusing operation period, there is no extreme change in the read frame rate and images of the imaging subject continuously can be displayed more smoothly.

[5-3. Luminance Detection]

In the focusing operation, the focal position is set to the position of the focus lens 101a where the contrast of the image data is maximal. Therefore, a brighter imaging subject is advantageous to the focusing operation. In view of this, with use of the brightness of the imaging subject detected by the exposure meter 112, the read frame rate may be lowered to lengthen the exposure time if the imaging subject is dark, and the read frame rate may be raised if the imaging subject is bright, thereby shortening the focusing operation period even further.

If the imaging subject is dark, the read frame rate of the frame immediately before the focusing operation period is lowered. This enables taking a longer exposure time. On the other hand, if the imaging subject is bright, the exposure time can be shorter, and therefore the read frame rate of the frame immediately before the focusing operation period is raised. This enables further shortening of the focusing operation period.

If the imaging subject is dark, the read frame rate in the focusing operation period is lowered. This enables taking a longer exposure time. On the other hand, if the imaging subject is bright, the exposure time can be shorter, and therefore the read frame rate in the focusing operation period is raised. This enables further shortening of the focusing operation period.

If the brightness of the imaging subject is darker than a predetermined brightness, image signals of the CCD 102 may be read after a plurality of frame periods in the focusing operation period have elapsed. This enables obtaining the same effect as lowering the read frame rate.

[5-4. Display Frame Rate]

Although the display frame rate of the LCD 107 may be set to the same frame rate as the read frame rate of the CCD 102 as in the present embodiment, the display frame rate of the LCD 107 may be set to the same display frame rate in both the normal operation period and the focusing operation period, even if the read frame rate of the CCD 102 changes. The former case enables images of the imaging subject continuously to be displayed more smoothly in the focusing operation period. Also, the latter case eliminates a change in the display frame rate in the focusing operation period as well, thereby enabling avoiding a sense of unpleasantness due to a change in the display frame rate.

[Embodiment 2]

Figure 5:
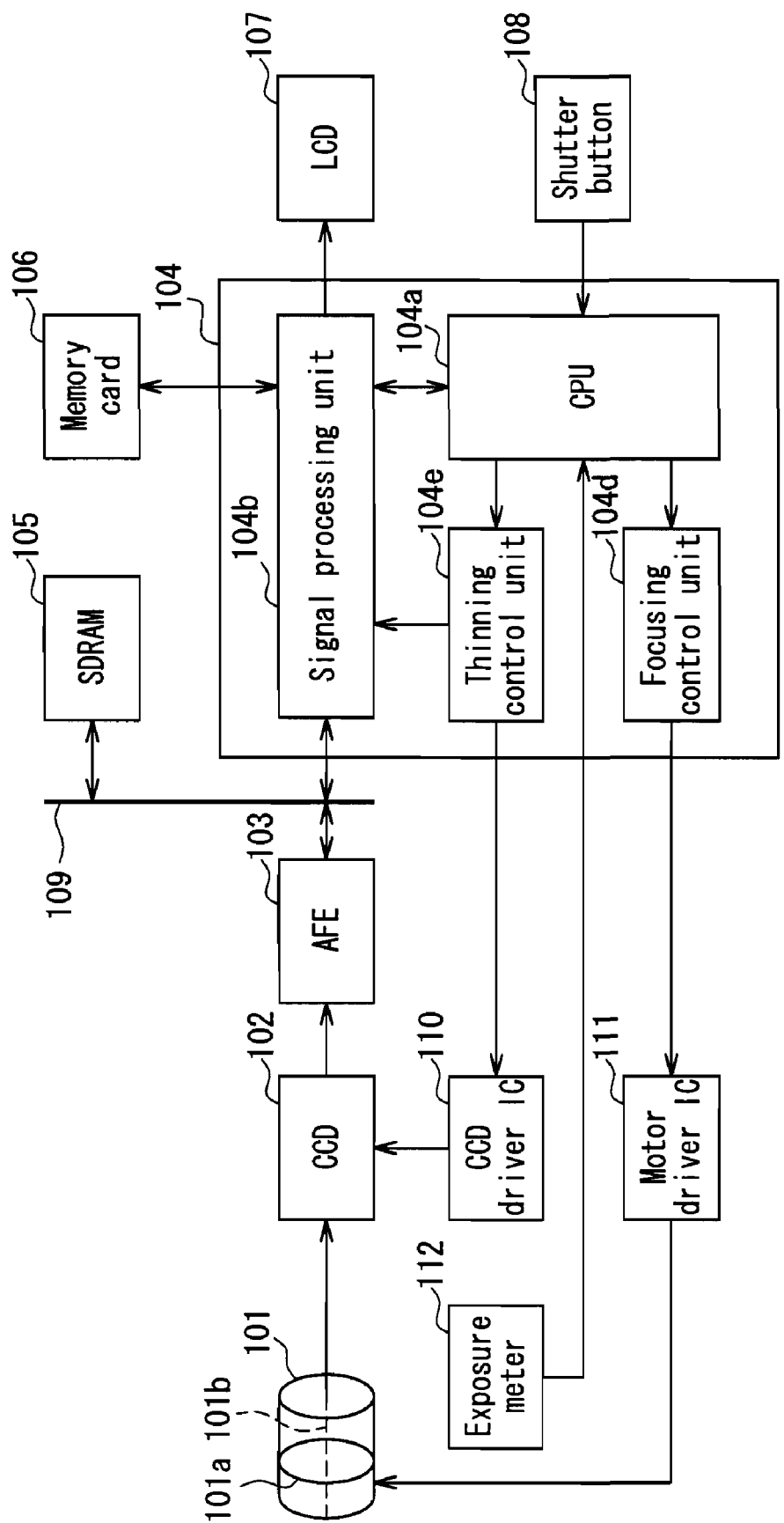
FIG. 5 is a block diagram showing a structure of a digital camera in Embodiment 2.

FIG. 5 shows a structure of an imaging device in Embodiment 2. The structure shown in FIG. 5 differs from the structure shown in FIG. 1 in that the thinning control unit 104c has been replaced with a thinning control unit 104e that can output a thinning instruction to the signal processing unit 104b.

Figure 6:
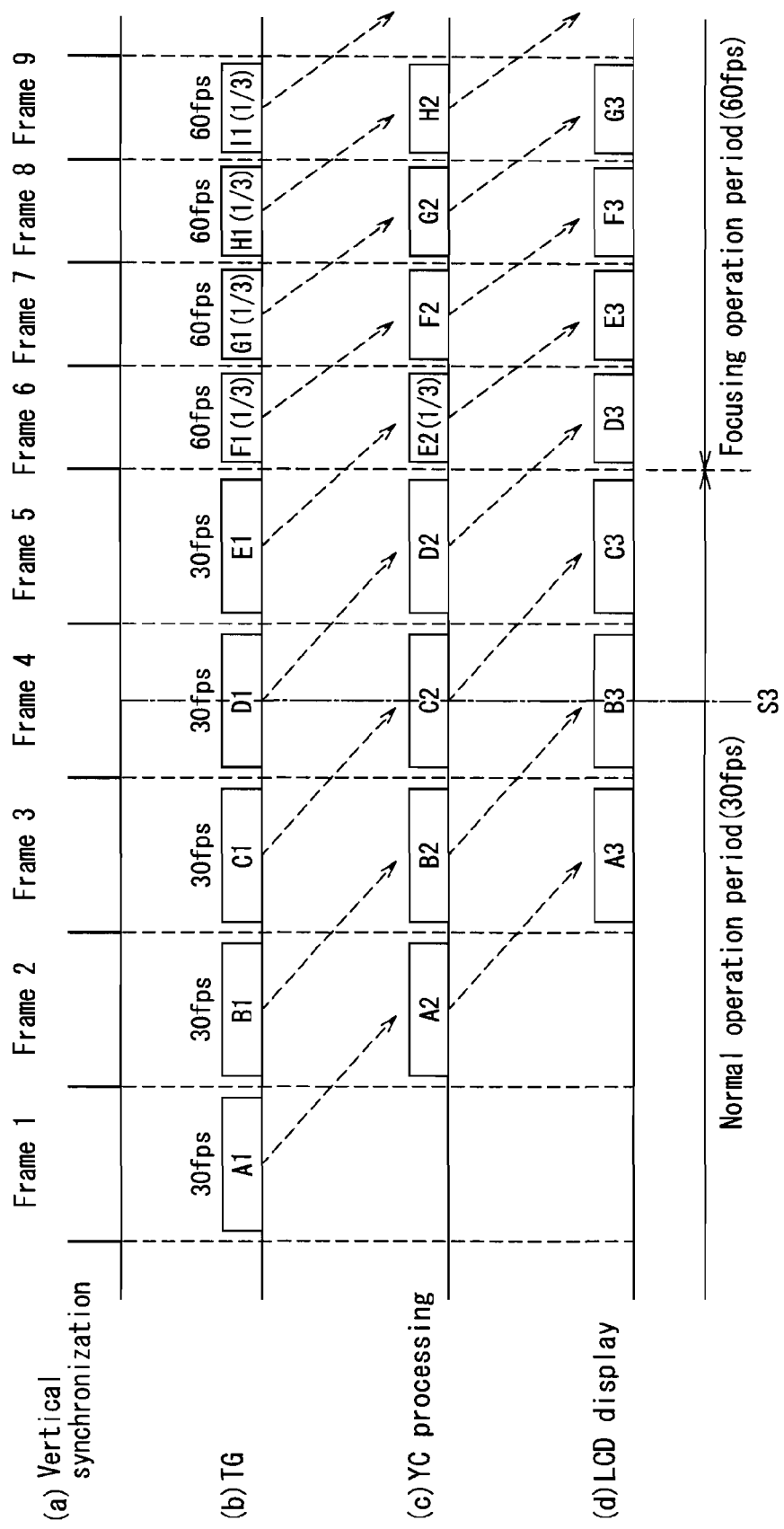
FIG. 6 is a timing chart showing a transition from the normal operation period to the focusing operation period in Embodiment 2.

FIG. 6 is a timing chart for illustrating operations of an imaging device in Embodiment 2. FIG. 6(*a*) is a vertical synchronization signal of the CCD 102. FIG. 6(*b*) indicates an image signal read from the CCD 102 driven by the CCD driver IC 110, and A1, B1, . . . indicate one frame-worth of image signals (in the figure, TG is an abbreviation for Timing Generator). Also, FIG. 6(*b*) shows the read frame rate in each frame. FIG. 6(*c*) indicates image data to be YC processed in the signal processing unit 104b, and A2, B2, . . . indicate one frame-worth of image signals. FIG. 6(d) indicates periods in which images are displayed on the LCD 107, and the characters A3, B3, . . . noted in the image display periods indicate one frame-worth of display data to be displayed in the image display periods. Also, S3 indicates a timing at which the shutter button 108 is pressed halfway. The following describes these operations.

Firstly, in the normal operation period indicated in frames 1 to 3, the CCD 102 reads, under drive control by the CCD driver IC 110, image signals based on the read frame rate of 30 fps as shown in FIG. 6(b). Note that read frame rate setting is performed in the vertical synchronization periods shown in FIG. 6(a), and the content of a setting becomes enabled in the next frame. For example, the read frame rate set in the vertical synchronization period of frame 1 becomes enabled with respect to an image signal B1 read from the CCD 102 in frame 2. The AFE 103 performs signal processing and digital conversion on the image signals read from the CCD 102, the resulting image data is input to the signal processing unit 104b, and the signal processing unit 104b performs YC processing on the image data output from the AFE 103.

As shown in FIG. 6(c), since the timing of the YC processing performed on the image data is furthermore one frame later than the timings of FIG. 6(b), for example, the YC processing performed on the image signal B1 read from the CCD 102 in frame 2 is performed in frame 3 as shown by image data B2.

Next, the signal processing unit 104b converts the image data resulting from the YC processing into display data that is displayable on the LCD 107. Since the timing of the processing for converting the image data to the display data is furthermore one frame later than the timings shown in FIG. 6(c), for example, the conversion processing performed on the image data B2 resulting from the YC processing in frame 3 is performed in frame 4, and display data B3 is generated. The LCD 107 displays images based on the display data in the periods shown in FIG. 6(d).

Next, if the shutter button 108 is pressed halfway at a timing S3 (frame 4), the thinning control unit 104e outputs a thinning instruction to the CCD driver IC 110 in the vertical synchronization period of frame 5, which is the immediately subsequent frame. Note that an image signal E1 read from the CCD 102 in frame 5 is read from the CCD 102 based on the drive mode (no thinning) set in the vertical synchronization period of frame 4, and therefore thinning processing is not performed.

Based on the thinning instruction sent from the thinning control unit 104e in frame 5, the CCD driver IC 110 performs control so that image signals on which 1/3 thinning processing has been performed are output from the CCD 102 at the timing of frame 6. Accordingly, an image signal F1 resulting from 1/3 thinning processing is obtained at the timing of frame 6 as shown in FIG. 6(b). Although the read frame rate of the CCD 102 is set to 60 fps at this time, the time required for reading is available in the frame since thinning processing is performed before reading the image signals from the CCD 102.

On the other hand, at a timing of performing YC processed in frame 6, 1/3 thinning processing is performed in the signal processing unit 104b on image data based on the image signal E1 read from the CCD 102 in frame 5. This is performed in response to the change in the read frame rate in frame 6 from 30 fps to 60 fps. Supposing that the read frame rate were changed to 60 fps without performing thinning processing on the image data, all of the image data for one screen could not be YC processed, and display data E3 could not be created properly. As a result, it would be necessary to continue displaying an image based on display data D3 at a timing when an image based on the display data E3 is to be displayed, and the display on the LCD 107 momentarily would freeze.

Next, in frame 7, an image signal G1 on which 1/3 thinning processing has been performed is output from the CCD 102. Also, since 1/3 thinning processing already has been performed on the image signal F1 at a timing when it was read from the CCD 102 in frame 6, the signal processing unit 104b does not perform thinning processing on the image signal F1 in frame 7.

From frame 8 until the focusing operation period ends, the thinning control unit 104e performs 1/3 thinning processing and then reads image signals from the CCD 102 similarly to frames 6 and 7, and the signal processing unit 104b does not perform thinning processing. Accordingly, the display data that is output from the signal processing unit 104b in frames 1 to 5 (normal operation period) is display data on which thinning processing has not been performed, and the display data that is output from the signal processing unit 104b from frame 6 onward (focusing operation period) is display data on which 1/3 thinning processing has been performed.

As described above, in the present embodiment, due to the signal processing unit 104b performing thinning processing on image signals output from the CCD 102 in the frame immediately before the focusing operation period, image data properly can be YC processed in the first frame of the focusing operation period in which the read frame rate has risen to 60 fps.

Also, in the focusing operation period, image signals are thinned before being read from the CCD 102, and therefore the display in portions of the screen does not freeze. This enables through-the-lens display in all areas of all frames in the focusing operation period, thereby obtaining the superior effect of being able to display images of the imaging subject on the LCD 107 without a sense of unpleasantness in the focusing operation period as well.

Note that in the present embodiment, the thinning rate in the signal processing unit 104b is exemplary, and it is desirable for this thinning rate to conform to the thinning rate of image signals in the CCD 102.

Also, although the thinning processing in the signal processing unit 104b is performed at a timing of performing YC processing on image signals (e.g., the image signal E1 in the example of FIG. 6) read from the CCD 102 in the frame immediately before the focusing operation period, thinning processing also may be performed in the signal processing unit 104b after entering the focusing operation period.

Also, in Embodiments 1 and 2, when the shutter button 108 is pressed halfway, the processing moves to the so-called high-speed focusing mode in which image signals are thinned before being output from the CCD 102, and the operating continues in high-speed focusing mode until the shutter button 108 is released from the halfway-pressed condition or until the shutter button 108 is fully pressed. However, the present invention may be structured so as to move to the normal focusing mode (a mode in which thinning processing is not performed on image signals) while in the high-speed focusing mode. In moving from the high-speed focusing mode to the normal focusing mode, for example, the exposure time of the CCD 102 while in the high-speed focusing mode may be monitored, and the processing may be moved to the normal focusing mode if the imaging subject becomes dark and the exposure time becomes longer.

Also, although a plurality of thinning rates may be set in the thinning control units 104c and 104e as described in Embodiments 1 and 2, one thinning rate may be set. In the case of one thinning rate, for example, thinning processing can be performed at the set thinning rate in the focusing operation period, and thinning processing may not be performed in the normal operation period.

[Embodiment 3]

Figure 7:
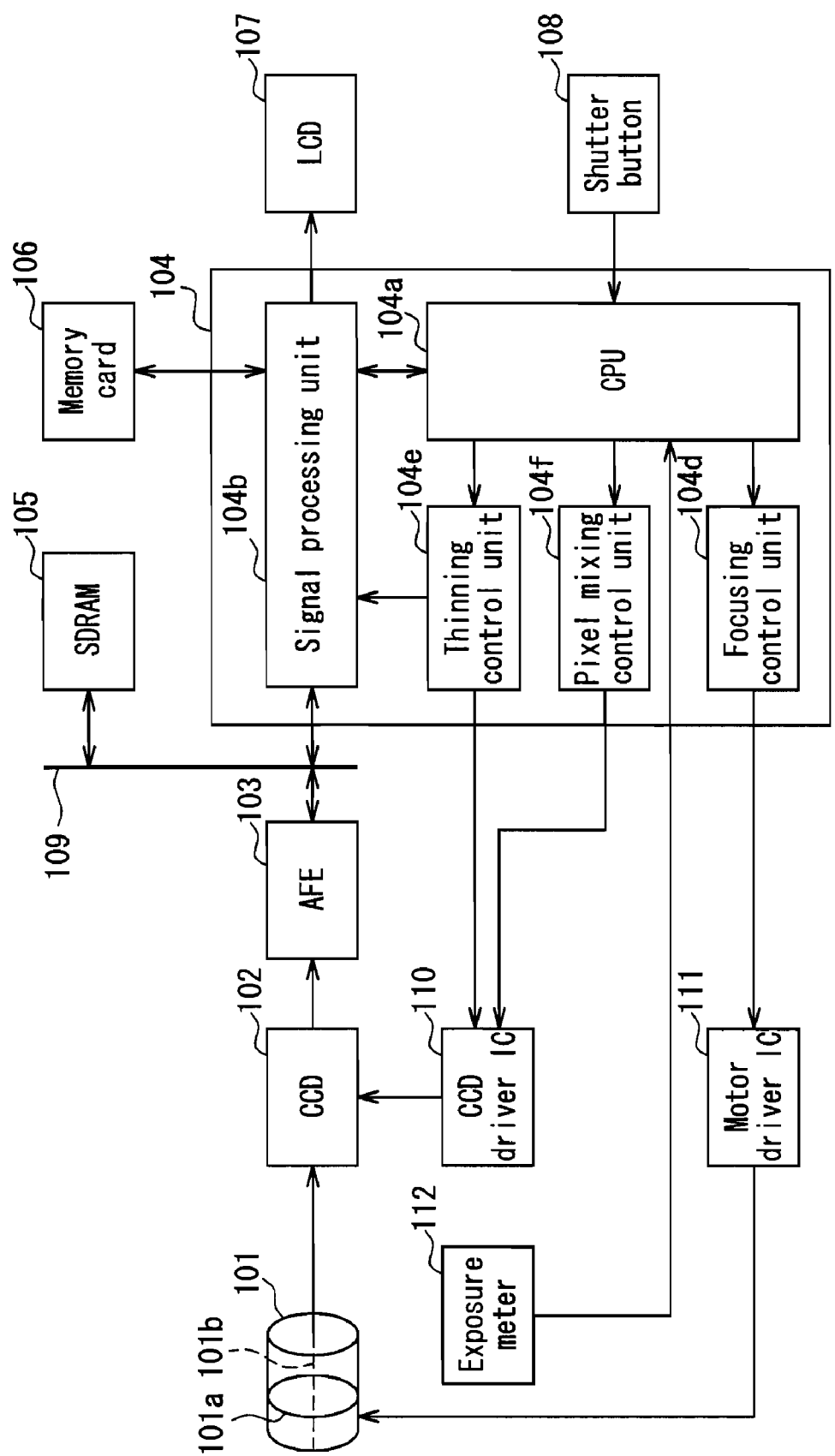
FIG. 7 is a block diagram showing a structure of a digital camera in Embodiment 3.

FIG. 7 shows a structure of an imaging device in Embodiment 3. The structure shown in FIG. 7 differs from the structure shown in FIG. 5 in that a pixel mixing control unit 104*f* has been added.

The pixel mixing control unit 104*f* can send a drive signal to the CCD driver IC 110 to perform control so that the pixel mixing number of the CCD 102 is changed. As a method of performing pixel mixing in the present embodiment, the image signals of peripheral pixels that are two pixels away from a predetermined pixel (center pixel) in the CCD 102 in the up, down, left, right, and diagonal direction are mixed. Also, in the present embodiment, the pixel mixing number set in the pixel mixing control unit 104*f* is three pixels in the normal operation period in FIG. 6 and nine pixels in the focusing operation period, and raising the pixel mixing number in the focusing operation period (to, for example, nine pixels), enables obtaining the same effect as lengthening the exposure time if the imaging subject is dark.

Figure 8:
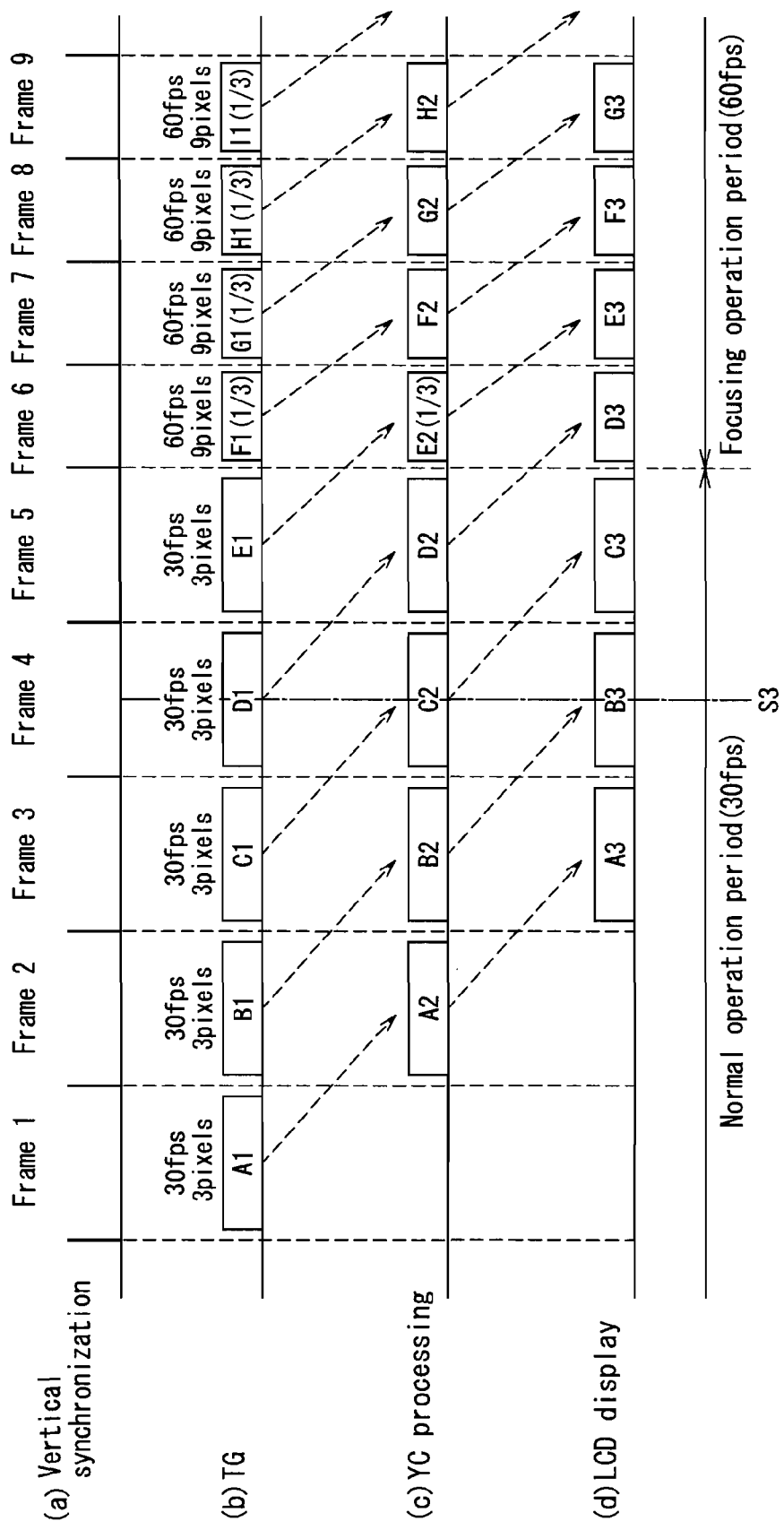
FIG. 8 is a timing chart showing a transition from the normal operation period to the focusing operation period in Embodiment 3.
Figure 9:
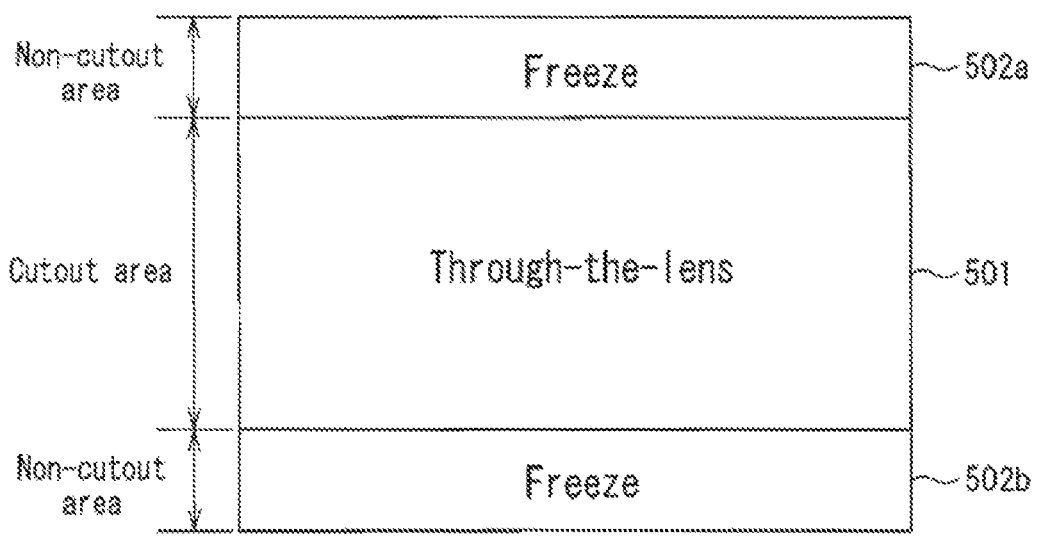
FIG. 9 is a conceptual diagram of a display unit in the focusing operation period in a digital camera according to Patent Document 1.

FIG. 8 is a timing chart for illustrating operations of an imaging device in Embodiment 3. The timing chart shown in FIG. 8 is different from the timing chart shown in FIG. 6 in that information pertaining to pixel mixing numbers has been added in FIG. 8(*b*). The following describes these operations.

Firstly, in the normal operation period shown in frames 1 to 3, the CCD 102 reads, under drive control by the CCD driver IC 110, image signals based on the read frame rate of 30 fps after performing three-pixel mixing processing as shown in FIG. 8(*b*). Note that at this time, thinning control is not performed by the thinning control unit 104*e*. The AFE 103 performs signal processing and digital conversion on the image signals read from the CCD 102, the resulting image data is input to the signal processing unit 104*b*, and the signal processing unit 104*b* performs YC processing on the image data output from the AFE 103.

Next, the signal processing unit 104*b* converts the image data resulting from the YC processing into display data that is displayable on the LCD 107. The LCD 107 displays images based on the display data in the periods shown in FIG. 8(*d*).

Next, if the shutter button 108 is pressed halfway at a timing S3 (frame 4), in the vertical synchronization period of frame 5, which is the immediately subsequent frame, the pixel mixing control unit 104*f* outputs a nine-pixel mixing instruction to the CCD driver IC 110, and also the thinning control unit 104*e* outputs a 1/3 thinning instruction to the CCD driver IC 110.

In frame 5, the CCD driver IC 110 performs control so that the image signal E1 is read from the CCD 102 after three-pixel mixing processing has been performed. Also, in frame 5, the signal processing unit 104*b* performs YC processing on the image signal D1 read from the CCD 102 in frame 4, thereby obtaining image data D2. Also, in frame 5, the signal processing unit 104*b* generates display data C3 based on the image data C2 on which YC processing was performed in frame 4.

Next, in frame 6, based on the pixel mixing instruction sent from the pixel mixing control unit 104*f* and the thinning instruction sent from the thinning control unit 104*e* in frame 5, the CCD driver IC 110 performs control so that the image signal F1 is read from the CCD 102 after nine-pixel mixing processing and 1/3 thinning processing have been performed. Note that although the read frame rate of the CCD 102 is set to 60 fps in frame 6, the time required for reading is available in the frame since the image signal is read from the CCD 102 after nine-pixel mixing processing and 1/3 thinning processing have been performed. Also, in frame 6, the signal processing unit 104*b* performs YC processing on the image signal E1 read from the CCD 102 in frame 5, thereby obtaining image data E2. At this time, based on the thinning instruction sent from the thinning control unit 104*e*, the signal processing unit 104*b* performs thinning processing on the image signal E1 at a thinning rate of 1/3. This is performed in response to the change in the read frame rate in frame 6 from 30 fps to 60 fps. Supposing that the read frame rate were changed to 60 fps without performing thinning processing on the image data, all of the image data for one screen could not be YC processed, and display data E3 could be properly created. As a result, it would be necessary to continue displaying an image based on display data D3 at a timing when an image based on the display data E3 is to be displayed, and the display on the LCD 107 would momentarily freeze. Also, in frame 6, the signal processing unit 104*b* generates display data D3 based on the image data D2 on which YC processing was performed in frame 5.

Next, in frame 7, the CCD driver IC 110 performs control so that an image signal G1 is read from the CCD 102 after nine-pixel mixing processing and 1/3 thinning processing have been performed. Also, in frame 7, the signal processing unit 104*b* performs YC processing on an image signal F1 read from the CCD 102 in frame 6, thereby obtaining image data F2. Also, in frame 7, the signal processing unit 104*b* generates the display data E3 based on the image data E2 on which YC processing was performed in frame 6.

From frame 8 until the focusing operation period has ended, the pixel mixing control unit 104*f* performs nine-pixel mixing processing in the CCD 102 similarly to frames 6 and 7. Also, the thinning control unit 104*e* performs control so that image signals are read from the CCD 102 after 1/3 thinning processing has been performed similarly to frame 7, and so that the signal processing unit 104*b* does not perform thinning processing.

Also, although three-pixel mixing processing is performed in the CCD 102 in the normal operation period in the above-described structure, there are cases in which nine-pixel mixing processing is performed in the normal operation period if the amount of light from the imaging subject is insufficient. In such a case, if the read frame rate of the CCD 102 were changed from 30 fps to 60 fps when entering the focusing operation period, the exposure time would be too short, and furthermore the amount of light from the imaging subject would be too small, and the focusing operation could not be performed properly.

In such a case, in addition to the CCD 102 performing the nine-pixel mixing operation in the normal operation period, if the exposure time in the CCD 102 is longer than a predetermined time (that is to say, if the imaging subject is dark), the read frame rate of the CCD 102 may be kept at 30 fps, without being changed to 60 fps, even when entering the focusing operation period after the shutter button 108 has been pressed halfway.

According to the above operation, if the amount of light from the imaging subject is already small in the normal operation period, the high-speed focusing operation (60 fps) is not performed in the focusing operation period, and image signals are read from the CCD 102 based on the same read frame rate as the read frame rate in the normal operation period. This prevents the amount of light from the imaging subject from becoming significantly smaller, and enables the focusing operation to be performed properly.

Note that although the pixel mixing number set by the pixel mixing control unit 104*f* is three pixels in the normal operation period and nine pixels in the focusing operation period in the present embodiment, the pixel mixing number of the frame immediately before entering the focusing operation period may be set to an intermediate value (e.g., six pixels) between three pixels and nine pixels. Such a structure eliminates an extreme change in the pixel mixing number and enables images of the imaging subject to be continuously displayed more smoothly.

Also, although the exposure meter 112 is an example of a luminance detection unit in FIG. 1, the exposure meter 112 does not necessarily need to be provided. For example, the brightness of the imaging subject can be measured based on the luminance of an image based on an image signal output from the CCD 102.

Industrial Applicability

The present invention enables through-the-lens display to be performed in all areas of all frames in the focusing operation period, and is therefore applicable to imaging devices such as digital cameras, digital video cameras, and mobile phone terminals having cameras, in which a focusing operation is performed while viewing a display means.

The invention claimed is:

1. An imaging device operable to perform a normal operation in a normal operation period and perform an automatic focusing operation in a focusing operation period, comprising:

a control unit that sets a read frame rate and a thinning rate; and an imaging element that generates image signals at the read frame rate set by the control unit, thins the generated image signals in accordance with the thinning rate set by the control unit, and outputs an image signal obtained by the thinning, wherein when changing from the normal operation to the automatic focusing operation, or changing from the automatic focusing operation to the normal operation, the control unit changes the read frame rate so that the read frame rate in the focusing operation period is different from the read frame rate in the normal operation period, and the thinning rate so that the thinning rate in the focusing operation period is different from the thinning rate in the normal operation period, wherein when changing the read frame rate and the thinning rate, the control unit changes the thinning rate, and reading the image signal from the imaging element in accordance with the changed thinning rate is completed prior to changing to the automatic focusing operation, or to the normal operation, and thereafter the read frame rate is changed.

2. The imaging device of claim 1, further comprising:

a signal processing unit that thins the image signals output by the imaging element in accordance with the thinning rate set by the control unit, and outputs an image signal obtained by the thinning.

3. The imaging device of claim 1, wherein when changing from the normal operation to the automatic focusing operation, the control unit raises the thinning rate and causes the imaging element to output an image signal in accordance with the changed thinning rate, and thereafter changes the read frame rate so that the read frame rate in the focusing operation period is higher than the read frame rate in the normal operation period.

4. The imaging device of claim 3, wherein in a frame immediately before moving to the automatic focusing operation, the control unit raises the thinning rate and causes the imaging element to output an image signal in accordance with the thinning rate obtained by the changing, and thereafter further changes the read frame rate.

5. The imaging device of claim 3, wherein among a plurality of frames before moving to the automatic focusing operation, in at least a frame immediately before the automatic focusing operation, the control unit changes the read frame rate so as to be higher than the read frame rate in the normal operation period and lower than the read frame rate in the focusing operation period.

6. The imaging device of claim 1, wherein in a case of moving from the automatic focusing operation to the normal operation, the control unit lowers the thinning rate and causes the imaging element to output an image signal at the thinning rate obtained by the changing, and thereafter changes the read frame rate so that the read frame in the normal operation period is lower than the read frame rate in the focusing operation period.

7. The imaging device of claim 6, wherein in a frame immediately before moving to the normal operation, the control unit lowers the thinning rate and causes the imaging element to output an image signal in accordance with the thinning rate obtained by the changing, and thereafter further changes the read frame rate.

8. The imaging device of claim 6, wherein among a plurality of frames before moving to the normal operation, in at least a frame immediately before the normal operation, the control unit changes the read frame rate so as to be lower than the read frame rate in the focusing operation period and higher than the read frame rate in the normal operation period.

9. The imaging device of claim 1, further comprising:

a display data processing unit that, based on output from the imaging element, generates display data expressing an image for display; and a display unit that displays the image based on the display data at a display frame rate that is the same as the read frame rate of the imaging element.

10. The imaging device of claim 1, further comprising:

a display data processing unit that, based on output from the imaging element, generates display data expressing an image for display; and a display unit that displays the image based on the display data at a display frame rate that, even in the focusing operation period, is the same frame rate as a read frame rate of the imaging element in the normal operation period.

11. The imaging device of claim 1, further comprising:

a luminance detection unit that detects a brightness of an imaging subject, wherein the control unit changes the read frame rate in the focusing operation period according to the brightness of the imaging subject detected by the luminance detection unit.

12. The imaging device of claim 11, wherein the control unit changes a frame rate of a frame immediately before the focusing operation period according to the brightness of the imaging subject detected by the luminance detection unit.

13. The imaging device of claim 1, further comprising:

a pixel mixing control unit that sets a pixel mixing number of the imaging element, wherein the pixel mixing control unit performs control so that in the focusing operation period, the image signal is read from the imaging element using a larger pixel mixing number than in the normal operation period.

14. The imaging device of claim 1,
wherein if a pixel mixing number in the normal operation period is greater than or equal to a predetermined value, the control unit performs control so that in the focusing operation period, the image signal is read from the imaging element based on the read frame rate in the normal operation period.

15. The imaging device according to claim 1, wherein when the read frame rate is changed, the thinning rate is also further changed.

16. An imaging device operable to perform a normal operation in a normal operation period and perform an automatic focusing operation in a focusing operation period, comprising:
a control unit that sets a read frame rate and a thinning rate;
an imaging element that generates image signals at the read frame rate set by the control unit; and
a signal processing unit that thins the image signals generated by the imaging element in accordance with the thinning rate set by the control unit, and outputs a thinned image signal obtained by the thinning,
wherein when changing from the normal operation to the automatic focusing operation, or changing from the automatic focusing operation to the normal operation, the control unit changes the read frame rate and the thinning rate so that the read frame rate in the focusing operation period is different from the read frame rate in the normal operation period, and the thinning rate in the focusing operation period is different from the thinning rate in the normal operation period,
wherein when changing the read frame rate and the thinning rate, the control unit changes the thinning rate, and processing of the thinned image signal is completed by the signal processing unit in accordance with the changed thinning rate prior to changing to the automatic focusing operation, or to the normal operation, and thereafter the read frame rate is changed.

17. The imaging device according to claim 16, wherein when the read frame rate is changed, the thinning rate is also further changed.

18. The imaging device of claim 16,
wherein when changing from the normal operation to the automatic focusing operation, the control unit raises the thinning rate and causes the imaging element to output an image signal in accordance with the changed thinning rate, and thereafter changes the read frame rate so that the read frame rate in the focusing operation period is higher than the read frame rate in the normal operation period.

19. The imaging device of claim 18,
wherein in a frame immediately before moving to the automatic focusing operation, the control unit raises the thinning rate and causes the imaging element to output an image signal in accordance with the thinning rate obtained by the changing, and thereafter changes the read frame rate.

20. The imaging device of claim 18,
wherein among a plurality of frames before moving to the automatic focusing operation, in at least a frame immediately before the automatic focusing operation, the control unit changes the read frame rate so as to be higher than the read frame rate in the normal operation period and lower than the read frame rate in the focusing operation period.

21. The imaging device of claim 16,
wherein in a case of moving from the automatic focusing operation to the normal operation, the control unit lowers the thinning rate and causes the signal processing unit to output an image signal at the thinning rate obtained by the changing, and thereafter changes the read frame rate so that the read frame in the normal operation period is lower than the read frame rate in the focusing operation period.

22. The imaging device of claim 21,
wherein in a frame immediately before moving to the normal operation, the control unit lowers the thinning rate and causes the signal processing unit to output an image signal in accordance with the thinning rate obtained by the changing, and thereafter changes the read frame rate.

23. The imaging device of claim 21,
wherein among a plurality of frames before moving to the normal operation, in at least a frame immediately before the normal operation, the control unit changes the read frame rate so as to be lower than the read frame rate in the focusing operation period and higher than the read frame rate in the normal operation period.

24. The imaging device of claim 16, further comprising:
a display data processing unit that, based on output from the signal processing unit, generates display data expressing an image for display; and
a display unit that displays the image based on the display data at a display frame rate that is the same as the read frame rate of the imaging element.

25. The imaging device of claim 16, further comprising:
a display data processing unit that, based on output from the signal processing unit, generates display data expressing an image for display; and
a display unit that displays the image based on the display data at a display frame rate that, even in the focusing operation period, is the same frame rate as a read frame rate of the imaging element in the normal operation period.

26. The imaging device of claim 16, further comprising:
a luminance detection unit that detects a brightness of an imaging subject,
wherein the control unit changes the read frame rate in the focusing operation period according to the brightness of the imaging subject detected by the luminance detection unit.

27. The imaging device of claim 26,
wherein the control unit changes a frame rate of a frame immediately before the focusing operation period according to the brightness of the imaging subject detected by the luminance detection unit.

28. The imaging device of claim 16, further comprising:
a pixel mixing control unit that sets a pixel mixing number of the imaging element,
wherein the pixel mixing control unit performs control so that in the focusing operation period, the image signal is read from the imaging element using a larger pixel mixing number than in the normal operation period.

29. The imaging device of claim 16,
wherein if a pixel mixing number in the normal operation period is greater than or equal to a predetermined value, the control unit performs control so that in the focusing operation period, the image signal is read from the imaging element based on the read frame rate in the normal operation period.

30. An imaging device operable to perform a normal operation in a normal operation period and perform an automatic focusing operation in a focusing operation period, comprising:

a control unit that sets a read frame rate and a thinning rate, the thinning rate includes a first thinning rate value for the normal operation and a second thinning rate value for the focusing operation period, wherein the second thinning rate value is different from the first thinning rate value;

an imaging element that generates image signals at the read frame rate set by the control unit; and a signal processing unit that thins the generated image signals from the imaging element in accordance with the thinning rate set by the control unit, and outputs a thinned image signal, wherein when changing from the normal operation to the automatic focusing operation, the control unit changes the thinning rate from the first thinning rate value to the second thinning rate value, wherein when changing from the automatic focusing operation to the normal operation, the control unit changes the thinning rate from the second thinning rate value to the first thinning rate value, and wherein when the control unit changes the thinning rate, reading the thinned image signal in accordance with the changed thinning rate is completed prior to changing to the automatic focusing operation, or to the normal operation.

31. The imaging device according to claim 30, wherein the thinning rate further includes a third thinning rate value for the normal operation, wherein the third thinning rate value is the same as the second thinning rate value, wherein when changing from the normal operation to the automatic focusing operation, the control unit changes the thinning rate from the first thinning rate value to the third thinning rate value, then to the second thinning rate value.

* * * * *